Figure 1:
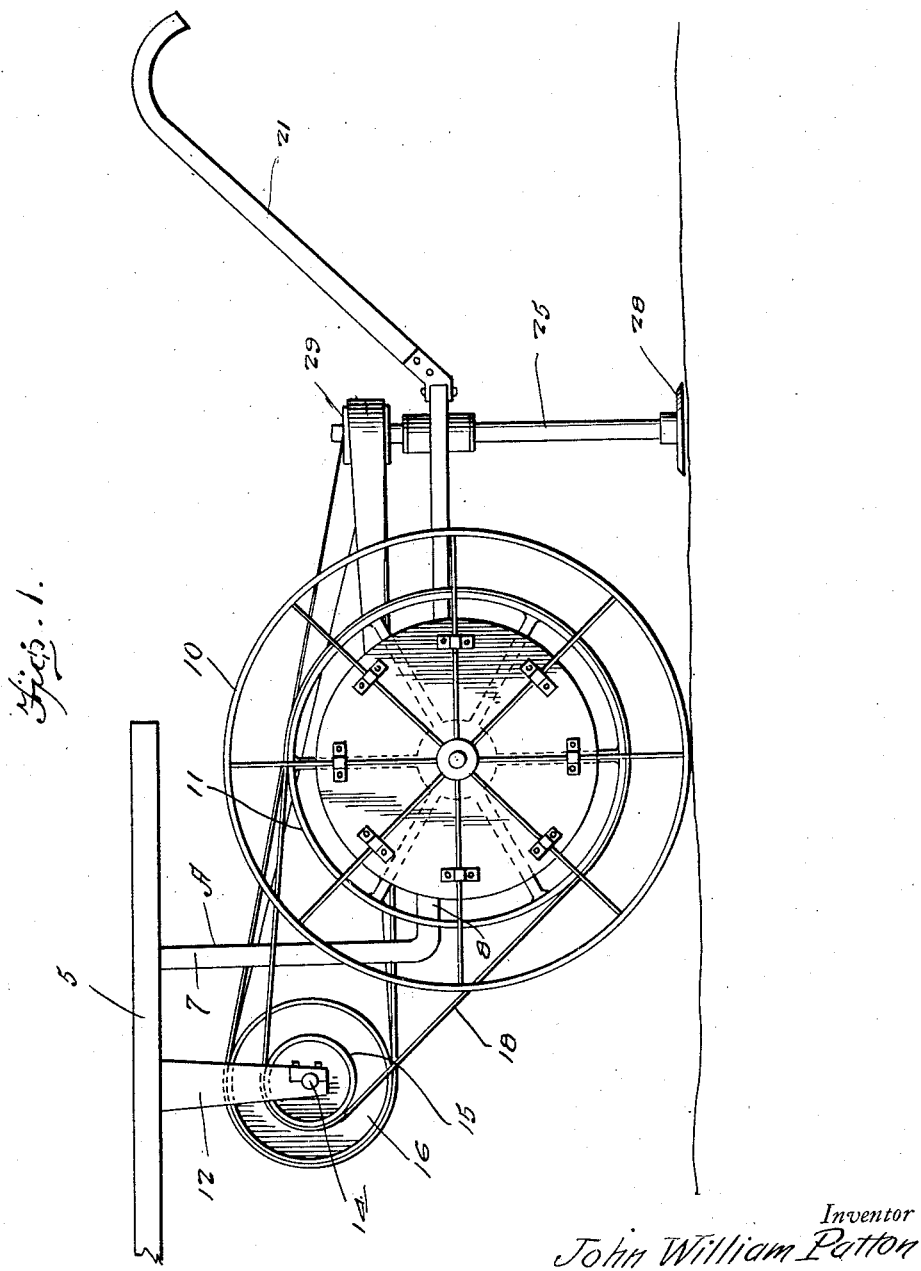

Jan. 10, 1928.

J. W. PATTON 1,655,509

COTTON CHOPPER

Filed Nov. 27, 1926        2 Sheets-Sheet 2

Inventor

John William Patton

By Clarence A. O'Brien
Attorney

Patented Jan. 10, 1928.

1,655,509

UNITED STATES PATENT OFFICE.

JOHN WILLIAM PATTON, OF MERIDIAN, MISSISSIPPI.

COTTON CHOPPER.

Application filed November 27, 1926. Serial No. 151,110.

The present invention relates to a cotton chopper, and has for its object to provide a structure wherein rotary disc choppers are mounted on a frame to be driven from the wheels thereof, said mounting permitting the manual positioning of the disc choppers at any desired angle that will prove practical in cotton choppers.

Another very important object of the invention lies in the provision of a cotton chopper of this nature with an exceedingly simple and accessible construction, one which will prove strong and durable in use, easy to manipulate, efficient and reliable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 2:
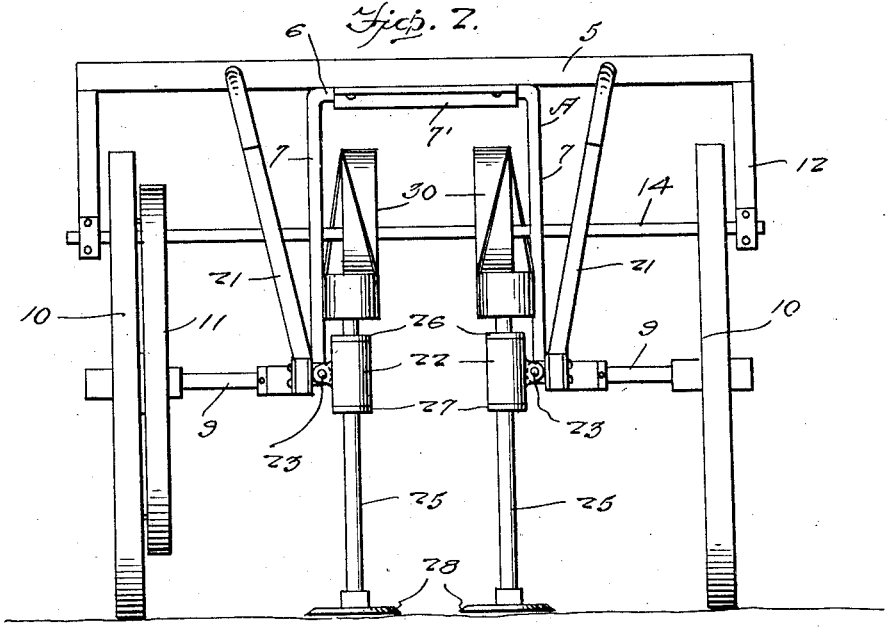
Figure 3:
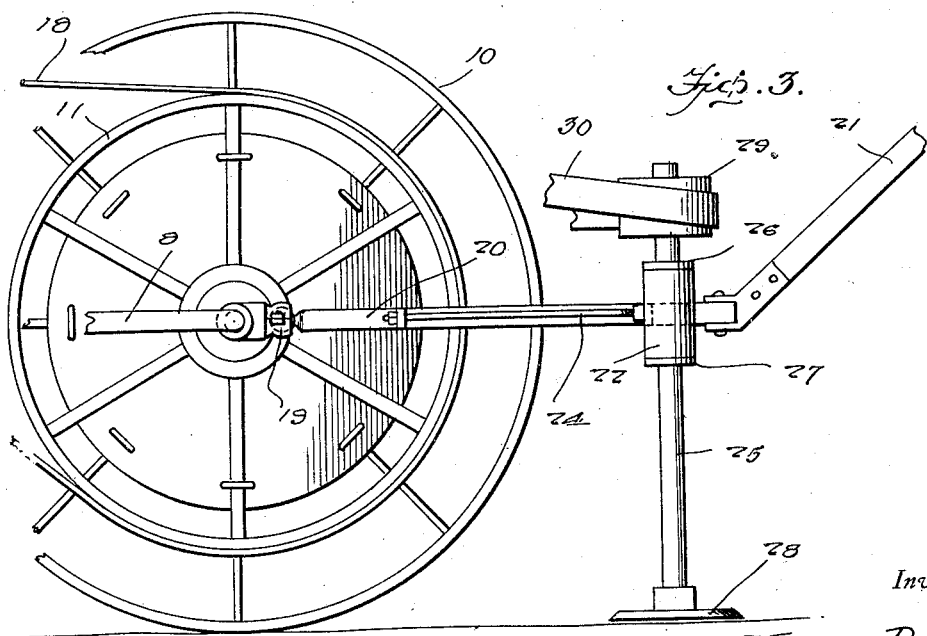

Figure 1 is a side elevation of a cotton chopper embodying the features of my invention, Figure 2 is a rear elevation thereof, and Figure 3 is a fragmentary enlarged side elevation.

Referring to the drawing in detail it will be seen that the numeral 5 denotes a frame of any preferred construction such as is used in cultivators. This frame 5 is mounted on an axle A. This axle A includes a horizontal central portion 6 which is engaged with the frame 5 by fastening means 7 of any preferred construction. Extending downwardly from the ends of the center horizontal portion 6 are two legs 7 and merging into rearwardly and horizontally extending portions 8 which in turn merge into outwardly and horizontally extending portions 9 on which are journaled wheels 10. A pulley 11 is fixed to one of the wheels 10 concentrically therewith. Arms 12 depend from the frame 5 forwardly of the axle A and have journaled in their lower extremity a shaft 14 on which is fixed a pulley 15 and a pair of relatively large pulleys 16. A belt 18 is trained over pulleys 11 and 15 so that the travel of the machine will impart rotation of the shaft 14.

Ball and socket joints 19 connect bars 20 with the outwardly and horizontally extending portions 7 of the axle A. These bars 20 extend rearwardly and have attached to their rear extremities handle bars 21. Bearing members 22 are pivotally engaged as at 23 with the bars 20 adjacent their rear ends and are braced thereto by rods 24. Shafts 25 are journaled in the bearing members 22 and are prevented from sliding movement therein by flanges 26 and 27, or in any other suitable manner. On the lower ends of these shafts 25 there are fixed disc choppers 28 while on the upper ends thereof there are fixed pulleys 29. Belts 30 are trained over pulleys 29 and the pulleys 16.

From the above detailed description it will be seen that as the cotton chopper is pulled along by any suitable draft means, the operator may manipulate the handle bars 21 so as to dispose the shafts 25 at different angles to the ground for controlling the angularity of the disc choppers 28 in respect to the cotton plants. Thus the cotton chopping process may be carried out in an efficient and reliable manner.

The present embodiment of the invention, of course, has been illustrated and described in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. A device of the class described comprising a frame, an axle bent to provide a center horizontal transverse portion fixed to the frame and having its ends merging into downwardly extending legs which merge into horizontal and rearwardly extending portions terminating in outwardly and horizontally extending portions, wheels journaled on the outwardly and horizontally extending portions, a pulley on one wheel, a pair of arms depending from the frame, a shaft journaled in the arms, a relatively small pulley and a pair of relatively large pulleys fixed to the shaft, an endless member trained over the relatively small pulley and wheel pulley, a pair of bars, universal joint means connecting the bars with the outwardly and horizontally extending portions of the axle, bearing members on the bars, chopper shafts journaled in the bearing members, chopper disc cutters on the lower ends of the chopper shafts, pulleys at the upper ends of the chopper shafts, and an endless member trained over the pair of relatively large pulleys and the chopper shaft pulleys.

2. A device of the class described comprising a frame, an axle bent to provide a center horizontal transverse portion fixed to the frame and having its ends merging into downwardly extending legs which merge into horizontally and rearwardly extending portions terminating in outwardly and horizontally extending portions, wheels journaled on the outwardly and horizontally extending portions, a pulley on one wheel, a pair of arms depending from the frame, a shaft journaled in the arms, a relatively small pulley, and a pair of relatively large pulleys fixed to the shaft, an endless member trained over the relatively small pulley, and the wheel, pulley, a pair of bars, universal joint means connecting the bars with the outwardly and horizontally extending portions of the axle, bearing members on the bars, chopper shafts journaled in the bearing members, chopper disc cutters on the lower ends of the chopper shafts, pulleys at the upper end of the chopper shafts, an endless member trained over the pair of relatively large pulleys and the chopper shaft pulleys, and handle bars connected to the rear ends of the first mentioned bars.

3. A device of the class described comprising a frame, an axle on the frame, wheels journaled on the axle, a shaft, means for journaling the shaft below the frame, a relatively small pulley, and a pair of relatively large pulleys fixed to the shaft, an endless member trained over the relatively small pulley and the wheel pulley, a pair of bars, universal joint means connecting the bars with the axle, bearing members on the bars, chopper shafts journaled in the bearing members, chopper disc cutters on the lower ends of the chopper shafts, pulleys at the upper ends of the chopper shafts, and an endless member trained over the pair of relatively large pulleys and the chopper shaft pulleys.

4. A device of the class described comprising a frame, an axle on the frame, wheels journaled on the axle, a shaft, means for journaling the shaft below the frame, a relatively small pulley, and a pair of relatively large pulleys fixed to the shaft, an endless member trained over the relatively small pulley and the wheel pulley, a pair of bars, universal joint means connecting the bars with the axle, bearing members on the bars, chopper shafts journaled in the bearing members, chopper disc cutters on the lower ends of the chopper shafts, pulleys at the upper ends of the chopper shafts, an endless member trained over the pair of relatively large pulleys and the chopper shaft pulleys, and handle bars fixed to the rear ends of the first mentioned bars.

5. A device of the class described comprising a frame, an axle bent to provide a center horizontal transverse portion fixed to the frame and having its ends merging into downwardly extending legs which merge into horizontal and rearwardly extending portions terminating in outwardly and horizontally extending portions, wheels journaled on the outwardly and horizontally extending portions, a pair of bars, universal joint means connecting the bars with the outwardly and horizontally extending portions of the axle, bearing members on the bars, chopper shafts journaled in the bearing members, chopper disk cutters on the lower ends of the chopper shafts, and gearing between said shafts and the said wheels for rotating the former by the latter.

In testimony whereof I affix my signature.

JOHN WILLIAM PATTON.